(12) United States Patent
Nunez et al.

(10) Patent No.: US 7,887,882 B2
(45) Date of Patent: Feb. 15, 2011

(54) STABILIZED ULTRA-VIOLET ABSORBERS

(75) Inventors: Ivan M. Nunez, Roanoke, VA (US); Venkat Sekharipuram, Roanoke, VA (US); Scott J. Carlesco, Roanoke, VA (US); Michele L. Alron, Roanoke, VA (US)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 449 days.

(21) Appl. No.: 11/054,673

(22) Filed: Feb. 9, 2005

(65) Prior Publication Data

US 2006/0175579 A1    Aug. 10, 2006

(51) Int. Cl.
*B05D 5/06* (2006.01)
*C09K 15/00* (2006.01)
*C09K 15/06* (2006.01)
*F21V 9/06* (2006.01)

(52) U.S. Cl. .................. 427/169; 427/160; 252/397; 252/407; 252/588; 252/589

(58) Field of Classification Search .......... 252/397, 252/407, 588, 589; 8/507; 427/160, 169
See application file for complete search history.

(56) References Cited

U.S. PATENT DOCUMENTS

| 2,267,050 | A | * | 12/1941 | Stevens | 435/4 |
|---|---|---|---|---|---|
| 3,219,458 | A | * | 11/1965 | Higby et al. | 426/262 |
| 4,323,597 | A | * | 4/1982 | Olson | 427/160 |
| 4,404,257 | A | * | 9/1983 | Olson | 428/412 |
| 5,080,921 | A | * | 1/1992 | Reimer | 426/564 |
| 5,098,445 | A | * | 3/1992 | Hung et al. | 8/507 |
| 5,204,090 | A | * | 4/1993 | Han | 424/59 |
| 5,681,871 | A | * | 10/1997 | Molock et al. | 523/106 |
| 5,776,478 | A | * | 7/1998 | Jain | 424/405 |
| 5,916,541 | A | * | 6/1999 | Stewart | 424/59 |
| 6,448,304 | B1 | | 9/2002 | Kosaka et al. | |
| 6,464,733 | B2 | * | 10/2002 | Ryser | 8/444 |
| 6,787,147 | B1 | * | 9/2004 | Huner et al. | 424/401 |
| 2002/0143203 | A1 | * | 10/2002 | Koch et al. | 556/400 |
| 2003/0127633 | A1 | * | 7/2003 | Heidenfelder et al. | 252/589 |
| 2004/0180800 | A1 | * | 9/2004 | McMahan | 510/201 |

FOREIGN PATENT DOCUMENTS

| JP | 01052404 A | * | 2/1989 |
|---|---|---|---|
| JP | 06175081 A | * | 6/1994 |
| WO | WO 9720246 A1 | * | 6/1997 |
| WO | WO 9727223 A1 | * | 7/1997 |

OTHER PUBLICATIONS

Lewis, Richard J., Sr. (2002). Hawley's Condensed Chemical Dictionary (14th Edition). John Wiley & Sons. Online version available at: http://www.knovel.com/knovel2/Toc.jsp?BookID=704&VerticalID=0.*
"Realemon Nutrition Facts" Accessed from http://www.drpeppersnapplegroup.com/brands/realemon on May 6, 2009.*

* cited by examiner

*Primary Examiner*—Mark Eashoo
*Assistant Examiner*—Peter F Godenschwager
(74) *Attorney, Agent, or Firm*—Occhiuti Rohlicek & Tsao LLP

(57) ABSTRACT

The invention provides UV absorber solutions that do not require use of a solvent to prevent formation of insoluble reaction products. The invention is useful in the manufacture of ocular devices including spectacle, contact and intraocular lenses, but may find its greatest utility in the manufacture of spectacle lenses.

6 Claims, No Drawings

STABILIZED ULTRA-VIOLET ABSORBERS

FIELD OF INVENTION

The invention relates to ophthalmic devices containing ultra-violet ("UV") absorbers. In particular, the invention relates to compositions and methods for producing ocular devices that contain ultra-violet absorber s. The compositions and methods of the invention provide stabilized UV absorber solutions in which formation of insoluble oxidation products is prevented.

BACKGROUND OF THE INVENTION

It is well known that UV radiation in the 210 to 380 nanometer range may cause corneal damage. Thus, ophthalmic devices, such as spectacle lenses, containing UV absorbers are desirable and methods for their production are known.

One method of incorporating the UV absorbers into the device is by imbibition using a bath containing a solution of the UV absorber. This method is disadvantageous in that some UV absorbers are highly insoluble and may produce a residue on the device surface. Additionally, insoluble reaction products may accumulate in the bath. If a solvent is used to facilitate dissolution of the UV absorber, the process not only becomes disadvantageous from environmental and safety standpoints, but use of a solvent typically does not prevent oxidative decomposition of the UV absorber and formation of insoluble decomposition products, such as material and color, within the bath. Using water-soluble UV absorbers as an alternative also results in a build-up of insoluble oxidation products within the bath that may contaminate and color lenses.

DETAILED DESCRIPTION OF THE INVENTION AND THE PREFERRED EMBODIMENTS

The invention provides UV absorber solutions and methods for their use in the production of ocular devices. The UV absorbers of the invention do not require use of a solvent to prevent formation of insoluble reaction products. Additionally, both formation of oxidative decomposition products and contamination resulting in coloration of the devices are prevented. The invention is useful in the manufacture of ocular devices including, without limitation, spectacle, contact and intraocular lenses, but may find its greatest utility in the manufacture of spectacle lenses.

In one embodiment, the invention provides an aqueous composition, comprising, consisting essentially of, and consisting of an UV absorber and an effective amount of an antioxidant. In another embodiment, the invention provides a method for producing UV absorber-containing ocular devices, comprising, consisting essentially of, and consisting of mixing at least one UV absorber with an effective amount of an antioxidant to form an aqueous solution.

By "UV absorber" is meant a compound or composition capable of absorbing or screening out UV radiation. Suitable UV absorbers are known in the art and are commercially available or methods for their making known. Preferred UV absorbers are those that are water-soluble, more preferably having water solubilities in the about 1 to about 20 weight percent range, and having sufficient diffusivity into the device material selected to be imbibed into that material. Generally, useful absorbers include, without limitation, benzophenones, benzotriazoles, triazines, substituted acrylonitriles, salicylic acid derivatives, benzoic acid derivatives, cinnamic acid derivatives, chalcone derivatives, dypnone derivatives, crotonic acid derivatives, diphenyl acrylates including, without limitation, ethyl-2-cyano-3,3-diphenyl acrylate and (2-ethylhexyl)-2-cyano-3,3-diphenyl acrylate and the like, and mixtures thereof. Preferably, the UV absorber is a benzotriazole, a benzophenone, or a combination thereof.

Examples of useful benzotriazoles include, without limitation, 2-(2'-hydroxyphenyl)benzotriazoles such as 2-(2'-hydroxyphenyl)-2H-benzotriazole and 5'-methyl, 3'5'-di-tert-butyl, 5'-(1,1,3,3-tetramethylbutyl), 5-chloro-3',5'-di-tert-butyl, 5-chloro-3'-tertbutyl-5'-methyl, 3'-secbutyl-5'-tertbutyl, 4'-octoxy, 3'5'-di-tert-amyl, 3',5'-bis($\alpha,\alpha$-dimethylbenzyl) derivatives, 2-(2-hydroxy)-2H-benzotraizole, 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2H-benzotriazol-2-yl)-6-dodecyl-4-methylphenol, 2-(2H-benzotriazol-2-yl)-4,6-di-tert-pentylphenol, and 2-(2H-benzotriazol-2-yl)-4-(1,1,3,3-tetramethylbutyl)phenol and the like, and mixtures thereof. Preferred benzotriazoles are 2-(2H-benzotriazol-2-yl)-6-dodecyl-4-methylphenol, 2-(2H-benzotriazol-2-yl)-4,6-di-tert-pentylphenol, and 2-(2H-benzotriazol-2-yl)-4-(1,1,3,3-tetramethylbutyl)phenol.

Examples of useful benzophenones include, without limitation, 2,2',4,4'-tetrahydroxybenzophenone, 2-hydroxy benzophenones such as 2,4-dihydroxybenzophenone, 2-hydroxy-4-acryloxy alkoxy benzophenones, 2-hydroxy-4-methacryloxy alkoxy benzophenones, allyl-2-hydroxybenzophenone, 2,4-dihydroxy benzophenone, 2-hydroxy-4-methoxy benzophenone, 2,2'-dihydroxy-4,4'-dimethoxybenzophenone-5,5'-bis (sodium sulfonate), 2-hydroxy-4-methoxy benzophenone-5-sulfonic acid, 2-hydroxy-4-methacryloxy benzophenone, as well as 4-hydroxy, 4-methoxy, 4-octoxy, 4-decloxy, 4-dodecyloxy, 4-benzyloxy, 4,2',2'-trihydroxy and 2'-hydroxy-4,4'-dimethoxy derivatives, and the like, and mixtures thereof. Preferred benzophenones are 2,2',4,4'-tetrahydroxybenzophenone, 2,2'-dihydroxy-4,4'-dimethoxybenzophenone-5,5'-bis (sodium sulfonate), 2-hydroxy-4-methoxy benzophenone-5-sulfonic acid, 2,4-dihydroxybenzophenone, 2,2'-dihydroxy-4,4'-dimethoxybenzophenone, and 2-hydroxy-4-methoxy benzophenone.

Generally the UV absorber is present in an absorbent effective amount, which is an amount sufficient to absorb at least about 80 percent of the UV light, in the range of from about 280 to about 370 nm, that impinges on the ocular device formed. One ordinarily skilled in the art will recognize that the specific amount of absorber used will depend on the molecular weight of the absorber and its extinction coefficient in the about 280 to about 370 nm range.

In a preferred embodiment, the UV absorber is incorporated into the ocular device by soaking the device in an aqueous bath containing the absorber. The bath preferably is maintained at a temperature of about 80 to about 96° C. The amount of UV absorber used in the bath typically will be about 0.5% to about 20% percent by wt based on the total weight of the bath. If a bath is used, a solvent may be necessary to solubilize the UV absorber in water.

It is a discovery of the invention that addition of an anti-oxidant into an aqueous or partially aqueous solution of UV absorber prevents the formation of insoluble reaction and oxidative decomposition products. Suitable anti-oxidants for use in the invention are those that are chemically compatible with the UV absorber in that the anti-oxidant does not degrade or substantially alter the UV absorber's performance. Preferably, the anti-oxidant is water-soluble and more preferably it is water-soluble and colorless. Exemplary anti-oxidants include, without limitation, ascorbic, citric and tartaric acids, sodium sulfite, sodium bisulfite, sodium metabisulfite, hydroquinones, beta-carotenes, flavonoids and the like and combinations thereof. Preferably, the antioxidant is an ascorbic, citric or tartaric acid, sodium sulfite, sodium bisulfite, sodium metabisulfite and more preferably a citric acid. In a more preferred embodiment, a citric acid, is used in combination with one or more of sodium sulfite, sodium bisulfite, or sodium metabisulfite. In a most preferred embodiment, the citric ascorbic acid used is in the form of commercially available lemon juice. Typical concentrations of ascorbic acid in lemon juice is about 46 mg/100 g of juice and for citric acid is about 5 to 8 weight percent.

An effective amount of the anti-oxidant is used meaning an amount sufficient to substantially prevent the formation of insoluble reaction products and oxidative decomposition products. The amount of antioxidant used will depend upon the antioxidant selected as well as the UV absorber used. The total amount of antioxidant used will be about 0.005 to about 1%, preferably about 0.5 to about 1% wt. based on the total weight of the bath.

The invention will be clarified further by a consideration of the following non-limiting examples.

EXAMPLES

Example 1

A total of 17.0 g (2% by weight) of 2,2',4,4'-tetrahydroxy benzophenone (UVINUL 3050, BASF), 25.5 g (3%) of citric acid and 85 mg (0.01%) of ascorbic acid were mixed with 850 g of deionized water, heated to 86° C. in a stainless steel bath and allowed to stand until all components had completely dissolved. Plano, CR39 lenses the front surface of which was coated with a scratch resistant, non-tintable coating (SHC-180 available from Lens Technology, Inc.) were placed in the solution for 3 minutes. The lenses were then removed, rinsed with DI water and measured for UV transmission and color and the results are shown in Table 1 below. The blocking system was found to be stable and effective after continuous heating at 86° C. for 17 days as measured by the average percent transmission in the 290-380 nm wavelength region.

TABLE 1

| Lot ID | L* | a* | b* | Haze | YIE313 | Y | 290–380 nm | % Block |
|---|---|---|---|---|---|---|---|---|
| 170-3 | 96.80 | −0.36 | 0.96 | 0.18 | 1.54 | 91.96 | 0.26 | 99.7 |
| 170-2 | 96.82 | −0.36 | 0.92 | 0.17 | 1.47 | 92.01 | 0.23 | 99.8 |
| 170-1 | 96.79 | −0.36 | 0.94 | 0.18 | 1.51 | 91.93 | 0.25 | 99.7 |
| Average | 96.80 | −0.36 | 0.94 | 0.18 | 1.51 | 91.97 | 0.25 | 99.7 |
| Std. Dev | 0.02 | 0.00 | 0.02 | 0.01 | 0.04 | 0.04 | 0.02 | 0.0 |
| 25-12 | 96.64 | −0.32 | 1.02 | 0.26 | 1.69 | 91.56 | 0.20 | 99.8 |
| 25-11 | 96.77 | −0.33 | 0.87 | 0.29 | 1.39 | 91.89 | 0.36 | 99.6 |
| 25-10 | 96.63 | −0.31 | 0.97 | 2.03 | 1.61 | 91.54 | 0.30 | 99.7 |
| Average | 96.68 | −0.32 | 0.95 | 0.86 | 1.56 | 91.66 | 0.29 | 99.7 |
| Std. Dev | 0.08 | 0.01 | 0.08 | 1.01 | 0.16 | 0.20 | 0.08 | 0.1 |
| A1 | 96.77 | −0.35 | 0.99 | 0.23 | 1.60 | 91.87 | 0.22 | 99.8 |
| A2 | 96.84 | −0.35 | 0.87 | 0.24 | 1.38 | 92.06 | 0.24 | 99.8 |
| A3 | 96.77 | −0.34 | 0.93 | 0.19 | 1.51 | 91.87 | 0.35 | 99.7 |
| Average | 96.79 | −0.35 | 0.93 | 0.22 | 1.50 | 91.93 | 0.27 | 99.7 |
| Std. Dev | 0.04 | 0.01 | 0.06 | 0.03 | 0.11 | 0.11 | 0.07 | 0.1 |

Example 2

A mixture consisting of 17.0 g (2% by weight) of UVINUL 3050, 25.5 g (3%) of citric acid, 86 mg (0.01%) of ascorbic acid, 85.6 mg (0.01%) of sodium metabisulfite, 85.8 mg (0.01%) of sodium sulfite and 850 g of deionized water was charged into a stainless steel bath, heated to 86° C. and allowed to stand until all components had completely dissolved. Plano, CR39 lenses the front surfaces of which were coated with SHC-180 coating were placed in the solution for 3 minutes. The lenses were then removed, rinsed with DI water and measured for UV transmission and color the results of which are shown in Table 2 below. The blocking system was found to be stable and effective after continuous heating at 86° C. for 17 days.

TABLE 2

| Lot ID | L* | a* | b* | Haze | YIE313 | Y | 290–380 nm | % Block |
|---|---|---|---|---|---|---|---|---|
| 170-6 | 96.92 | −0.34 | 0.93 | 0.15 | 1.50 | 92.24 | 0.34 | 99.7 |
| 170-5 | 96.93 | −0.34 | 0.92 | 0.17 | 1.49 | 92.26 | 0.30 | 99.7 |
| 170-4 | 96.89 | −0.35 | 0.97 | 0.16 | 1.56 | 92.17 | 0.24 | 99.8 |
| Average | 96.91 | −0.34 | 0.94 | 0.16 | 1.52 | 92.22 | 0.29 | 99.7 |
| Std. Dev | 0.02 | 0.01 | 0.03 | 0.01 | 0.04 | 0.05 | 0.05 | 0.1 |
| 25-15 | 96.59 | −0.31 | 1.10 | 1.41 | 1.85 | 91.43 | 0.24 | 99.8 |
| 25-14 | 96.70 | −0.33 | 0.89 | 3.04 | 1.44 | 91.70 | 0.15 | 99.7 |
| 25-13 | 96.74 | −0.33 | 0.86 | 0.35 | 1.38 | 91.80 | 0.15 | 99.7 |
| Average | 96.68 | −0.32 | 0.95 | 1.60 | 1.56 | 91.64 | 0.25 | 99.8 |
| Std. Dev | 0.08 | 0.01 | 0.13 | 1.36 | 0.26 | 0.19 | 0.01 | 0.1 |
| A4 | 96.78 | −0.33 | 0.84 | 0.25 | 1.33 | 91.90 | 0.26 | 99.7 |
| A5 | 96.73 | −0.38 | 0.99 | 0.42 | 1.58 | 91.77 | 0.24 | 99.8 |
| A6 | 96.70 | −0.35 | 0.91 | 0.16 | 1.46 | 91.71 | 0.24 | 99.8 |
| Average | 96.74 | −0.35 | 0.91 | 0.28 | 1.46 | 91.79 | 0.25 | 99.8 |
| Std. Dev | 0.04 | 0.03 | 0.08 | 0.13 | 0.13 | 0.10 | 0.01 | 0.0 |

Example 3

A mixture consisting of 17.0 g (2% by weight) of UVINUL 3050, 25.5 g (3%) of citric acid, 85.5 mg (0.01%) of ascorbic acid, 85.5 mg (0.01%) of sodium metabisulfite and 850 g of deionized water was charged into a stainless steel bath, heated to 86° C. and allowed to stand until all components had completely dissolved. Plano, CR39 lenses the front surface of which was coated with SHC-180 coating were placed in the solution for 3 minutes. The lenses were then removed, rinsed with DI water and measured for UV transmission and color and the results are shown in Table 3 below. The blocking system was found to be stable and effective after continuous heating for 17 days.

TABLE 3

| Lot ID | L* | a* | b* | Haze | YIE313 | Y | 290–380 nm | % Block |
|---|---|---|---|---|---|---|---|---|
| 170-9 | 96.83 | −0.34 | 0.94 | 0.15 | 1.53 | 92.02 | 0.22 | 99.8 |
| 170-8 | 96.84 | −0.34 | 0.94 | 0.15 | 1.51 | 92.06 | 0.19 | 99.8 |
| 170-7 | 96.82 | −0.34 | 1.00 | 0.16 | 1.64 | 91.99 | 0.22 | 99.8 |
| Average | 96.83 | −0.34 | 0.96 | 0.15 | 1.56 | 92.02 | 0.21 | 99.8 |
| Std. Dev | 0.01 | 0.00 | 0.03 | 0.01 | 0.07 | 0.04 | 0.02 | 0.0 |
| 25-18 | 96.83 | −0.33 | 0.82 | 0.78 | 1.29 | 92.02 | 0.27 | 99.7 |
| 25-17 | 96.74 | −0.34 | 0.92 | 0.40 | 1.48 | 91.80 | 0.19 | 99.8 |
| 25-16 | 96.52 | −0.30 | 1.18 | 0.50 | 2.00 | 91.26 | 0.29 | 99.7 |

TABLE 3-continued

| Lot ID | L* | a* | b* | Haze | YIE313 | Y | 290–380 nm | % Block |
|---|---|---|---|---|---|---|---|---|
| Average | 96.70 | −0.32 | 0.97 | 0.56 | 1.59 | 91.69 | 0.25 | 99.7 |
| Std. Dev | 0.16 | 0.02 | 0.19 | 0.02 | 0.37 | 0.39 | 0.05 | 0.1 |
| A7 | 96.72 | −0.34 | 0.89 | 0.15 | 1.43 | 91.75 | 0.24 | 99.8 |
| A8 | 96.76 | −0.36 | 0.95 | 0.15 | 1.52 | 91.86 | 0.27 | 99.7 |
| A9 | 96.77 | −0.33 | 1.01 | 0.18 | 1.66 | 91.89 | 0.37 | 99.6 |
| Average | 96.75 | −0.34 | 0.95 | 0.16 | 1.54 | 91.83 | 0.29 | 99.7 |
| Std. Dev | 0.03 | 0.02 | 0.06 | 0.02 | 0.12 | 0.07 | 0.07 | 0.1 |

Example 4

A total of 17.0 g (2% by weight) of UVINUL 3050, 25.5 g (3%) of citric acid, 85.5 mg (0.01%) of ascorbic acid and 86 mg (0.01%) of sodium sulfite were mixed with 850 g of deionized water, heated to 86° C. in a stainless steel bath and allowed to stand until all components had completely dissolved. Plano, CR39 lenses the front surfaces of which were coated with SHC-180 coating were placed in the solution for 3 minutes. The lenses were then removed, rinsed with DI water and measured for UV transmission and color the results or which are shown in Table 4 below. The blocking system was found to be stable and effective after continuous heating for 17 days.

TABLE 4

| Lot ID | L* | a* | b* | Haze | YIE313 | Y | 290–380 nm | % Block |
|---|---|---|---|---|---|---|---|---|
| 170-12 | 96.80 | −0.35 | 0.95 | 0.16 | 1.54 | 91.96 | 0.24 | 99.8 |
| 170-11 | 96.88 | −0.34 | 0.94 | 0.20 | 1.52 | 92.14 | 0.29 | 99.7 |
| 170-10 | 96.83 | −0.35 | 0.98 | 0.15 | 1.59 | 92.03 | 0.20 | 99.8 |
| Average | 96.84 | −0.35 | 0.96 | 0.17 | 1.55 | 92.04 | 0.25 | 99.8 |
| Std. Dev | 0.04 | 0.01 | 0.02 | 0.03 | 0.04 | 0.09 | 0.05 | 0.0 |
| 25-21 | 96.75 | −0.35 | 0.90 | 0.40 | 1.44 | 91.82 | 0.18 | 99.8 |
| 25-20 | 96.79 | −0.35 | 0.86 | 0.25 | 1.36 | 91.92 | 0.19 | 99.8 |
| 25-19 | 96.77 | −0.35 | 0.87 | 0.32 | 1.38 | 91.89 | 0.18 | 99.8 |
| Average | 96.77 | −0.35 | 0.88 | 0.32 | 1.39 | 91.88 | 0.18 | 99.8 |
| Std. Dev | 0.02 | 0.00 | 0.02 | 0.08 | 0.04 | 0.05 | 0.00 | 0.0 |
| A10 | 96.82 | −0.35 | 0.87 | 0.15 | 1.37 | 92.00 | 0.24 | 99.8 |
| A11 | 96.84 | −0.35 | 0.89 | 0.20 | 1.43 | 92.05 | 0.23 | 99.8 |
| A12 | 96.80 | −0.34 | 0.83 | 0.19 | 1.31 | 91.95 | 0.22 | 99.8 |
| Average | 96.82 | −0.35 | 0.86 | 0.18 | 1.37 | 92.00 | 0.23 | 99.8 |
| Std. Dev | 0.02 | 0.01 | 0.03 | 0.03 | 0.06 | 0.05 | 0.01 | 0.0 |

Example 5

A total of 80.0 g (2% by weight) of UVINUL 3050 was mixed with 4 L of deionized water, heated to 85° C. in a stainless steel circulating bath and allowed to stand until all components had completely dissolved. After running this bath for 2 days, an insoluble, floating brownish precipitate formed. The following solvents were used in an attempt to find a solvent in which the precipitate was soluble: acetone, isopropanol, acetonitrile, hexane or methylene chloride. The precipitate was insoluble in these solvents and adhered to lenses placed in the solution. Also, the solution became very dark, indicating thermo-oxidative decomposition of the blocker. Plano, CR39 lenses the front surfaces of which were coated with SHC-180 coating were placed in the solution for 3 minutes. The lenses were then removed, manually cleaned with isopropyl alcohol or acetone, rinsed with DI water and measured for UV transmission and color. The lenses obtained in this bath were visually yellow (YIE313>2). The blocking system was found not to be suitable for continued use.

Example 6

A total of 430.6 g (2.0% by weight) of UVINUL 3050, 215.1 g (1.0%) of citric acid, 2.17 (0.01%) of ascorbic acid, 2.15 g (0.01%) of sodium sulfite and 21.5 kg of deionized water were charged into a stainless steel circulating bath, heated to 85° C. and allowed to stand until all components had completely dissolved. Plano, CR39 lenses the front surfaces of which were coated with SHC-180 coating were placed in the solution for 3 minutes. The lenses were then removed, rinsed with DI water and measured for UV transmission and color and the results are shown in Table 5 below. The blocking system was found to be stable and effective after continuous heating at 86° C. for 15 days.

TABLE 5

| Lot ID | L* | a* | b* | Haze | YIE313 | Y | 290–380 nm | % Block |
|---|---|---|---|---|---|---|---|---|
| 19-13 | 96.74 | −0.38 | 0.98 | 0.71 | 1.57 | 91.80 | 0.13 | 99.9 |
| 19-14 | 96.76 | −0.38 | 0.96 | 99.88 | 1.54 | 92.86 | 0.12 | 99.9 |
| 19-15 | 96.75 | −0.37 | 0.96 | 0.27 | 1.54 | 91.82 | 0.13 | 99.9 |
| Average | 96.75 | −0.38 | 0.97 | 33.62 | 1.55 | 91.83 | 0.13 | 99.9 |
| Std. Dev | 0.01 | 0.01 | 0.01 | 57.38 | 0.02 | 0.03 | 0.01 | 0.0 |
| 170-15 | 96.82 | −0.34 | 0.92 | 0.13 | 1.48 | 91.99 | 0.36 | 99.9 |
| 170-14 | 96.78 | −0.36 | 0.99 | 0.15 | 1.60 | 91.91 | 0.19 | 99.9 |
| 170-13 | 96.80 | −0.36 | 0.99 | 0.14 | 1.59 | 91.95 | 0.19 | 99.9 |
| Average | 96.80 | −0.35 | 0.97 | 0.14 | 1.56 | 91.95 | 0.25 | 99.9 |
| Std. Dev | 0.02 | 0.01 | 0.04 | 0.01 | 0.07 | 0.04 | 0.10 | 0.0 |
| 23-07 | 96.66 | −0.33 | 1.04 | 0.42 | 1.72 | 91.60 | 0.19 | 99.8 |
| 23-08 | 96.65 | −0.32 | 1.06 | 0.35 | 1.76 | 91.58 | 0.21 | 99.8 |
| 23-09 | 96.67 | −0.33 | 1.05 | 0.28 | 1.74 | 91.64 | 0.19 | 99.8 |
| Average | 96.66 | −0.33 | 1.05 | 0.35 | 1.74 | 91.61 | 0.20 | 99.8 |
| Std. Dev | 0.01 | 0.01 | 0.01 | 0.07 | 0.02 | 0.03 | 0.01 | 0.0 |
| 25-09 | 96.39 | −0.28 | 1.36 | 0.61 | 2.36 | 90.96 | 0.25 | 99.8 |
| 25-08 | 96.55 | −0.31 | 1.18 | 0.49 | 2.01 | 91.34 | 0.24 | 99.8 |
| 25-07 | 96.58 | −0.33 | 1.15 | 0.34 | 1.93 | 91.42 | 0.24 | 99.8 |
| Average | 96.51 | −0.31 | 1.23 | 0.48 | 2.10 | 91.24 | 0.24 | 99.8 |
| Std. Dev | 0.10 | 0.03 | 0.11 | 0.14 | 0.23 | 0.25 | 0.00 | 0.0 |
| UV3 | 96.80 | −0.36 | 1.01 | 0.17 | 1.64 | 91.96 | 0.20 | 99.8 |
| UV2 | 96.81 | −0.35 | 1.05 | 0.29 | 1.72 | 91.97 | 0.27 | 99.7 |
| UV1 | 96.84 | −0.33 | 0.94 | 0.15 | 1.52 | 92.05 | 0.41 | 99.6 |
| Average | 96.82 | −0.35 | 1.00 | 0.17 | 1.63 | 91.99 | 0.29 | 99.7 |
| Std. Dev | 0.02 | 0.02 | 0.06 | 0.02 | 0.10 | 0.05 | 0.11 | 0.1 |

Example 7

Plano, CR39 lenses the front surfaces of which were coated with SHC-180 coating were measured for UV transmission and color. The results are shown in Table 6 below. The lenses then were placed in a solution of 430.6 g (2.0% by weight) of UVINUL 3050, 215.1 g (1.0%) of citric acid, 2.17 (0.01%) of ascorbic acid, 2.15 g (0.01%) of sodium sulfite and 21.5 kg of deionized water charged into a stainless steel circulating bath, heated to 85° C. for 3 minutes. The bath was allowed to stand until all components had completely dissolved before the lenses were placed into the bath. The lenses were then removed, rinsed with DI water and measured for UV transmission and color the results of which are shown in Table 7 below.

TABLE 6

| Lot ID | L* | a* | b* | YIE313 | Y | 290–380 nm |
|---|---|---|---|---|---|---|
| 41-01 | 96.90 | −0.11 | 0.36 | 0.60 | 92.19 | 6.7 |
| 41-02 | 96.90 | −0.10 | 0.34 | 0.57 | 92.19 | 7.5 |
| 41-03 | 96.92 | −0.11 | 0.36 | 0.59 | 92.25 | 6.7 |
| 41-04 | 96.91 | −0.10 | 0.35 | 0.58 | 92.22 | 7.5 |
| Average | 96.91 | −0.11 | 0.35 | 0.59 | 92.21 | 7.081 |
| Std. Dev | 0.01 | 0.01 | 0.01 | 0.01 | 0.03 | 0.474 |

TABLE 7

| Lot ID | L* | a* | b* | YIE313 | Y | 290–380 nm |
|---|---|---|---|---|---|---|
| 41-01 | 96.80 | −0.56 | 1.19 | 1.83 | 91.95 | 0.018 |
| 41-02 | 96.76 | −0.55 | 1.20 | 1.85 | 91.86 | 0.017 |
| 41-03 | 96.79 | −0.55 | 1.20 | 1.85 | 91.93 | 0.017 |
| 41-04 | 96.82 | −0.58 | 1.24 | 1.90 | 91.99 | 0.017 |
| Average | 96.79 | −0.56 | 1.21 | 1.86 | 91.93 | 0.017 |
| Std. Dev | 0.02 | 0.01 | 0.02 | 0.031 | 0.053 | 0.000 |

Example 8

A total of 440 g (2.0% by weight) of UVINUL 3050, 1.4 L of pure lemon juice from concentrate, commercially available as REAL LEMON BRAND®, and enough deionized water to make up a 22 L total volume were charged into a stainless steel circulating bath, heated to 85° C. and allowed to stand until all components had completely dissolved. Plano, CR39 lenses the front surfaces of which were coated with SHC-180 coating were placed in the solution for 3 minutes. The lenses were then removed, rinsed with DI water and measured for UV transmission and color and the results are shown in Table 8 below.

TABLE 8

| Lot ID | L* | a* | B* | Haze | YIE313 | Y | 290–380 nm | % Block |
|---|---|---|---|---|---|---|---|---|
| 18-01 | 96.88 | −0.37 | 0.98 | 0.21 | 1.57 | 92.14 | 0.14 | 99.9 |
| 18-01 | 96.87 | −0.36 | 0.95 | 0.23 | 1.53 | 92.13 | 0.27 | 99.7 |
| 18-03 | 96.90 | −0.38 | 0.96 | 0.13 | 1.53 | 92.20 | 0.16 | 99.8 |
| Average | 96.88 | −0.37 | 0.96 | 0.19 | 1.54 | 92.16 | 0.19 | 99.8 |
| Std. Dev | 0.02 | 0.01 | 0.02 | 0.028 | 0.02 | 0.04 | 0.07 | 0.1 |
| 18-04 | 96.83 | −0.40 | 1.04 | 0.37 | 1.66 | 92.01 | 0.12 | 99.9 |
| 18-05 | 96.88 | −0.41 | 1.01 | 0.22 | 1.59 | 92.15 | 0.09 | 99.9 |
| 18-06 | 96.89 | −0.41 | 1.02 | 0.16 | 1.62 | 92.17 | 0.09 | 99.9 |
| Average | 96.87 | −0.41 | 1.02 | 0.25 | 1.62 | 92.11 | 0.10 | 99.9 |
| Std. Dev | 0.03 | 0.01 | 0.02 | 0.11 | 0.04 | 0.09 | 0.02 | 0.0 |
| 18-07 | 96.91 | −0.36 | 0.91 | 0.16 | 1.45 | 92.23 | 0.09 | 99.9 |
| 18-08 | 96.88 | −0.35 | 0.91 | 0.29 | 1.44 | 92.15 | 0.09 | 99.9 |
| 18-09 | 96.89 | −0.37 | 0.94 | 0.23 | 1.49 | 92.17 | 0.09 | 99.9 |
| Average | 96.89 | −0.36 | 0.93 | 0.26 | 1.47 | 92.16 | 0.09 | 99.9 |
| Std. Dev | 0.01 | 0.01 | 0.02 | 0.04 | 0.04 | 0.01 | 0.00 | 0.0 |
| 18-10 | 96.88 | −0.36 | 0.93 | 0.27 | 1.48 | 92.15 | 0.13 | 99.9 |
| 18-11 | 96.84 | −0.36 | 0.94 | 0.18 | 1.51 | 92.06 | 0.15 | 99.9 |
| 18-12 | 96.86 | −0.35 | 0.93 | 0.16 | 1.48 | 92.10 | 0.17 | 99.8 |
| Average | 96.86 | −0.36 | 0.93 | 0.20 | 1.49 | 92.10 | 0.15 | 99.8 |
| Std. Dev | 0.02 | 0.01 | 0.01 | 0.06 | 0.02 | 0.05 | 0.02 | 0.0 |

What is claimed is:

1. A method for producing an ocular device comprising an ultraviolet absorber, wherein the method comprises
   providing an aqueous composition consisting essentially of
      from 0.5 percent to 20 percent of a water-soluble ultraviolet absorber selected from the group consisting of benzophenones, benzotriazoles, triazines, substituted acrylonitriles, salicylic acid derivatives, benzoic acid derivatives, cinnamic acid derivatives, chalcone derivatives, dypnone derivatives, crotonic acid derivatives, diphenyl acrylates, and mixtures thereof,
      from 0.5 percent to 1 percent of a water-soluble antioxidant that is citric acid in the form of lemon juice concentrate, and
      water,
   heating the aqueous composition until complete dissolution of all components,
   applying the aqueous composition onto the ocular device by using a dipping technique.

2. A method for producing an ocular device comprising an ultraviolet absorber, wherein the method comprises
   providing an aqueous composition consisting essentially of
      from 0.5 percent to 20 percent of a water-soluble ultraviolet absorber selected from the group consisting of benzophenones, benzotriazoles, triazines, substituted acrylonitriles, salicylic acid derivatives, benzoic acid derivatives, cinnamic acid derivatives, chalcone derivatives, dypnone derivatives, crotonic acid derivatives, diphenyl acrylates, and mixtures thereof,
      from 0.5 percent to 1 percent of a water-soluble antioxidant that is citric acid in the form of lemon juice concentrate, and
      water,
   heating the aqueous composition to a temperature of about 80 to 96 degrees Celsius until complete dissolution of all components so as to obtain an aqueous bath containing the ultraviolet absorber,
   soaking the ocular device in said aqueous bath while maintaining the aqueous bath at a temperature of about 80 to 96 degrees Celsius,
   removing the ocular device from said aqueous bath, and rinsing the ocular device.

3. The method for producing an ocular device of claim 2, wherein the step of soaking the ocular device further comprises soaking for about three minutes.

4. The method of claim 2, wherein the antioxidant is the citric acid and one or more of ascorbic acid, tartaric acid, sodium sulfite, sodium bisulfite, or sodium metabisulfite.

5. The method of claim 2, wherein the ultraviolet absorber is a benzotriazole, a benzophenone, or a combination thereof.

6. The method of claim 5, wherein the ultraviolet absorber is selected from the group consisting of 2-(2H-benzotriazol-2-yl)-6-dodecyl-4-methylphenol, 2-(2H-benzotriazol-2-yl)-4,6-di-tert-pentylphenol, and 2-(2H-benzotriazol-2-yl)-4-(1,1,3,3-tetramethylbutyl)phenol, 2,2',4,4'-tetrahydroxybenzophenone, 2,2'-dihydroxy-4,4'-dimethoxybenzophenone-5,5-bis(sodium sulfonate), 2-hydroxy-4-methoxy benzophenone-5-sulfonic acid, 2,4-dihydroxybenzophenone, 2,2'-dihydroxy-4,4'-dimethoxybenzophenone, and 2-hydroxy-4-methoxy benzophenone.

* * * * *